United States Patent
Yamamoto et al.

(10) Patent No.: US 9,942,529 B2
(45) Date of Patent: Apr. 10, 2018

(54) IMAGE PROJECTION DEVICE

(71) Applicant: HITACHI MAXELL, LTD., Ibaraki-shi, Osaka (JP)

(72) Inventors: Shoji Yamamoto, Tokyo (JP); Yoshiho Seo, Tokyo (JP); Koji Hirata, Ibaraki (JP); Hiroyuki Urata, Ibaraki (JP); Takashi Matsubara, Tokyo (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 14/892,700

(22) PCT Filed: Sep. 27, 2013

(86) PCT No.: PCT/JP2013/076386
§ 371 (c)(1),
(2) Date: Nov. 20, 2015

(87) PCT Pub. No.: WO2015/045125
PCT Pub. Date: Apr. 2, 2015

(65) Prior Publication Data
US 2016/0105653 A1    Apr. 14, 2016

(51) Int. Cl.
*H04N 9/31* (2006.01)
*H04N 9/12* (2006.01)
(Continued)

(52) U.S. Cl.
CPC ........... *H04N 9/3179* (2013.01); *G03B 17/54* (2013.01); *G06F 3/017* (2013.01); *G09G 5/00* (2013.01); *G09G 5/36* (2013.01); *H04N 9/3194* (2013.01)

(58) Field of Classification Search
CPC .................................................. H04N 9/3179
(Continued)

(56) References Cited

U.S. PATENT DOCUMENTS 8,018,579 B1 * 9/2011 Krah ...................... G01B 11/00
356/4.01
8,947,349 B1 * 2/2015 Hart ........................ G09G 3/002
345/156
(Continued)

FOREIGN PATENT DOCUMENTS

EP    2 466 896 A2    6/2012
JP    2008-146374 A    6/2008
(Continued)

OTHER PUBLICATIONS

EP Communication, the partial supplementary European Search Report dated Apr. 21, 2017 in the EP Application No. 13894422.8.
(Continued)

*Primary Examiner* — Paulos M Natnael
*Assistant Examiner* — Justin Sanders
(74) *Attorney, Agent, or Firm* — Volpe and Koenig, P.C.

(57) ABSTRACT

Provided is an image projection device that carries out high precision gesture detection. An image projection device has a projection unit that optically projects image and a gesture detection unit that detects human gestures and generates a signal for operating the projected image on the basis of the detection results. The gesture detection unit controls a range for detecting gesture according to the direction that the projection unit projects light and/or the placement state of the image projection device. The device has a laser light source and photodiode for detecting gestures, or has a pyroelectric sensor for detecting infrared rays.

15 Claims, 10 Drawing Sheets

(51) Int. Cl.
  *G09G 5/00* (2006.01)
  *G09G 5/36* (2006.01)
  *G06F 3/01* (2006.01)
  *G03B 17/54* (2006.01)

(58) Field of Classification Search
  USPC .......................................................... 348/744
  See application file for complete search history.

(56) References Cited

U.S. PATENT DOCUMENTS

| | | | |
|---|---|---|---|
| 9,109,886 B1 * | 8/2015 | Haskin | G01C 3/08 |
| 2005/0270430 A1 * | 12/2005 | Falck | G08C 17/02 |
| | | | 348/744 |
| 2006/0028624 A1 | 2/2006 | Kaise et al. | |
| 2009/0262098 A1 | 10/2009 | Yamada | |
| 2011/0155911 A1 * | 6/2011 | Claytor | G01J 1/06 |
| | | | 250/338.3 |
| 2012/0017147 A1 | 1/2012 | Mark | |
| 2012/0092630 A1 | 4/2012 | Furuichi et al. | |
| 2012/0154595 A1 | 6/2012 | Sassi | |
| 2013/0002823 A1 | 1/2013 | Lim et al. | |
| 2013/0127717 A1 | 5/2013 | Nagashima | |

FOREIGN PATENT DOCUMENTS

| | | |
|---|---|---|
| JP | 2008-227883 A | 9/2008 |
| JP | 2008-287142 A | 11/2008 |
| JP | 2009-258569 A | 11/2009 |
| JP | 2010-258623 A | 11/2010 |
| JP | 2011-043834 A | 3/2011 |
| JP | 2011-188008 A | 9/2011 |
| JP | 2012-032464 A | 2/2012 |
| JP | 2012-220419 A | 11/2012 |
| WO | 2008-111601 A1 | 9/2008 |

OTHER PUBLICATIONS

Lv et al. "Design of human motion detection and tracking robot based on pyroelectric infrared sensor", World Congress on Intelligent Control and Automation (WCICA), Jul. 6-9, 2010 2010; pp. 3737-3740.

The Extended European Search Report dated Jul. 12, 2017 in the EP Application No. 13894422.8.

* cited by examiner

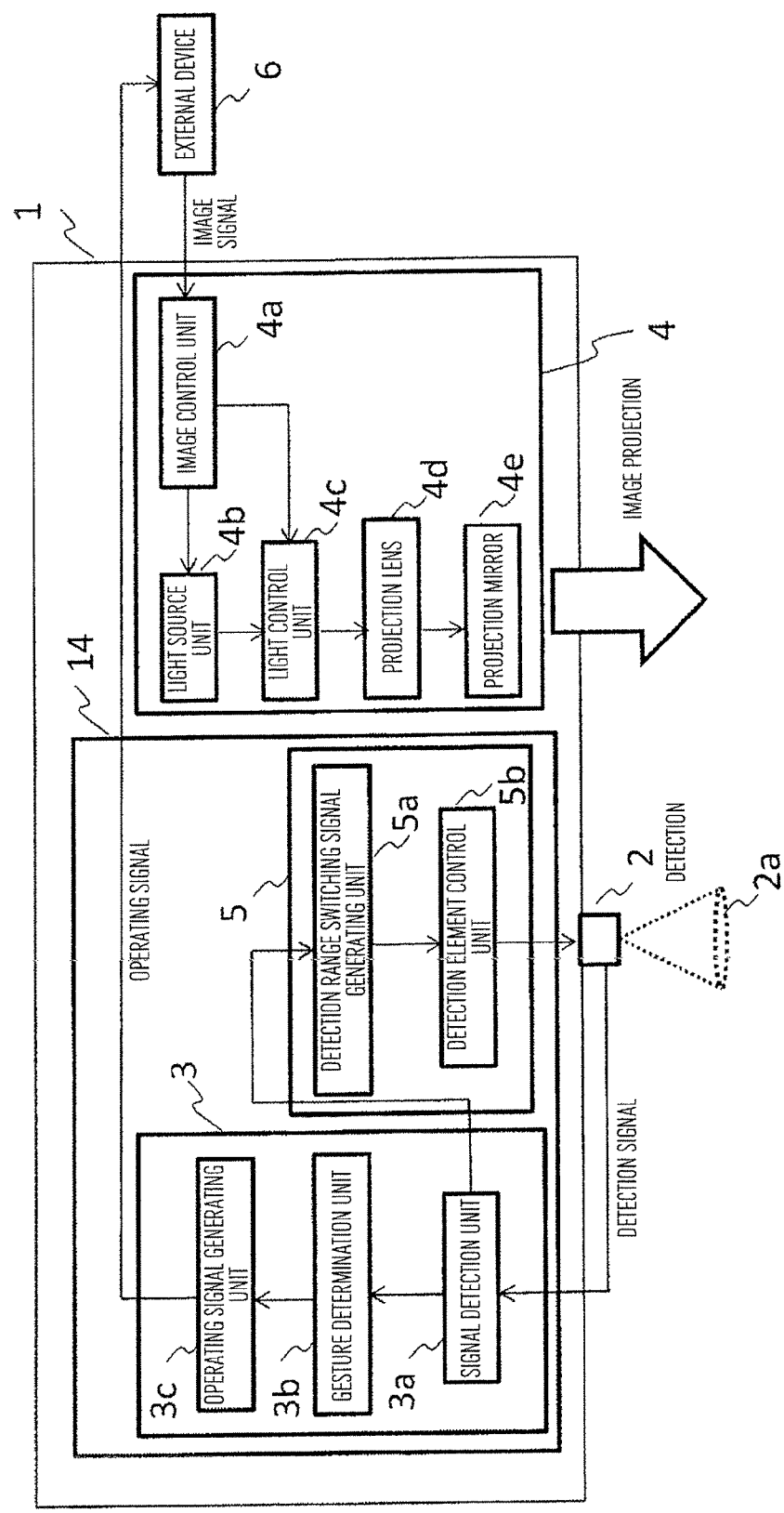

FIG.9
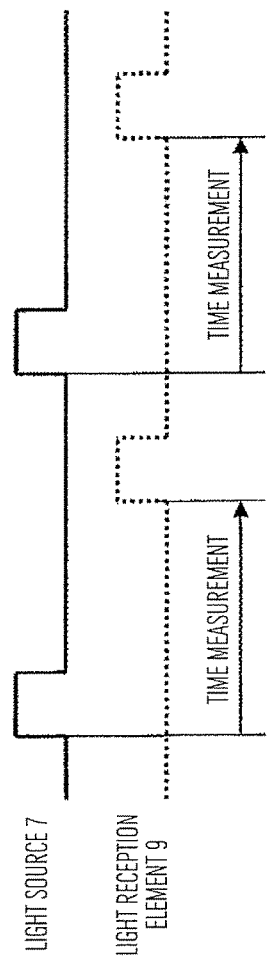
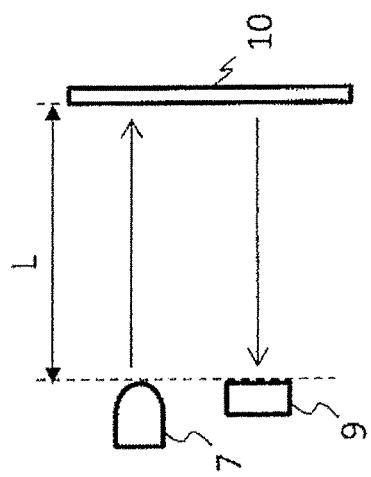

FIG.11A
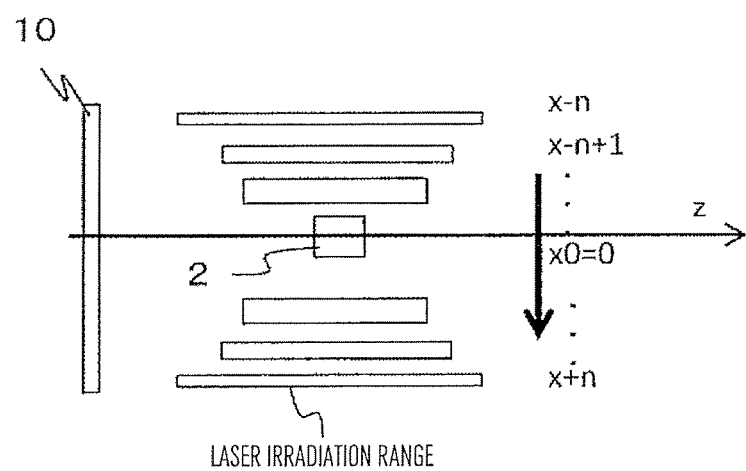
LASER IRRADIATION RANGE
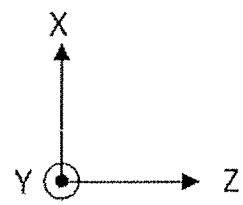

FIG.11B
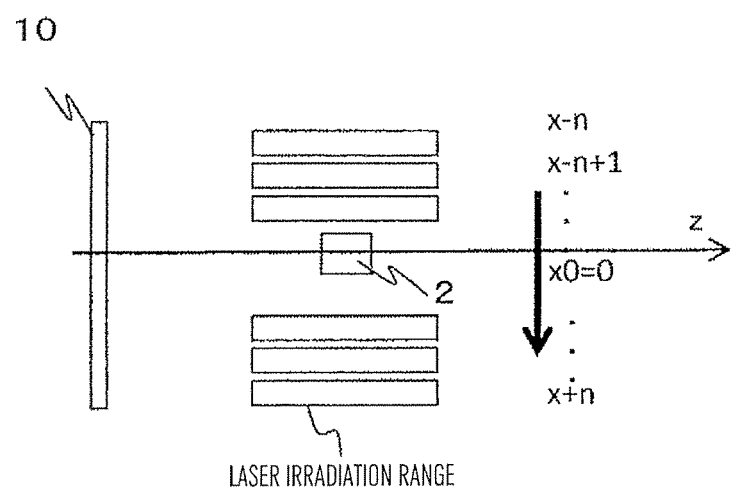
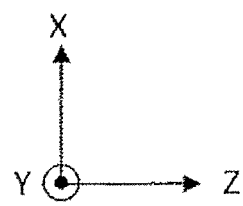

IMAGE PROJECTION DEVICE

TECHNICAL FIELD

The present invention relates to an image projection device.

BACKGROUND ART

Patent Literature 1 below is raised as background art of the present technical field. In an abstract of this publication, "to provide a projection-type image display device that does not make a person in a projection image feel uncomfortable and that does not make a person looking at the image feel uncomfortable" is described as an object, and the projection-type image display device "including a driving mechanism driving a person detection means to be movable in a specific direction to adjust a detection range of the person detection means and a control means changing a state of an image that is being projected when the person detection means detects existence of a person" is described as a means to achieve the object.

CITATION LIST

Patent Literature

Patent Literature 1: JP-A-2011-043834

SUMMARY OF INVENTION

Technical Problem

In Patent Literature 1, the person detection means is controlled so that, even in a case in which a projection range of a projector is changed, the projection range and the detection range of a sensor which detects a person may be equal ranges, and detection of a person is performed by detecting large movement of the person. However, since the detection range is broad, and sensitivity is low, it is difficult to detect fine movement of the person (hereinafter, referred to as a gesture) such as body and hand motions.

Currently, in an image projection device (hereinafter, it may be abbreviated as a projection device), for example, a function of detecting a gesture of an operator of the projection device and controlling the projection device itself or a display image in response to the gesture is being developed. In an example of such control, when a certain gesture is detected, the projection device is turned off, or the display image is scrolled or replayed frame by frame.

However, since the gesture is performed only in a limited and small space, it is an object to detect a gesture with high accuracy by optimizing a gesture detection range.

Solution to Problem

To solve the above problems, the present invention employs a configuration described in the claims, for example.

The present application includes a plurality of components to solve the above problems, and examples thereof include an image projection device which projects light having image information and displays an image, the image projection device including: a projection unit including: a light source unit which generates light; a light control unit which generates an optical image based on the image information using the light generated by the light source unit; and a projection optical unit which projects the light generated by the light control unit; and a gesture detection unit including: a detection element which includes a sensor that detects a gesture of an operator of the image projection device; and an operating signal generating unit which generates an operating signal for operating an image signal associated with the image information based on the gesture detected by the detection element.

Advantageous Effects of Invention

The present invention exerts an effect of enabling an image projection device improving accuracy of gesture detection to be achieved.

BRIEF DESCRIPTION OF DRAWINGS

FIG. 3 is a block diagram illustrating an internal configuration of the projection device;

FIG. 9 illustrates a principle of a TOF scheme;

FIG. 11A is a first view illustrating a laser irradiation range of the detection element viewed from a direction of a +y axis; and FIG. 11B is a second view illustrating a laser irradiation range of the detection element viewed from the direction of the +y axis.

DESCRIPTION OF EMBODIMENTS

Hereinafter, embodiments of the present invention will be described with reference to the drawings.

Embodiment 1

In the present embodiment, a configuration of a projection device and a detection unit detecting a person, an optimal detection range which differs depending on a projection direction, and a detection range control unit setting the optimal detection range will be described.

First, the configuration of the projection device and the detection unit will be described.

Figure 1:
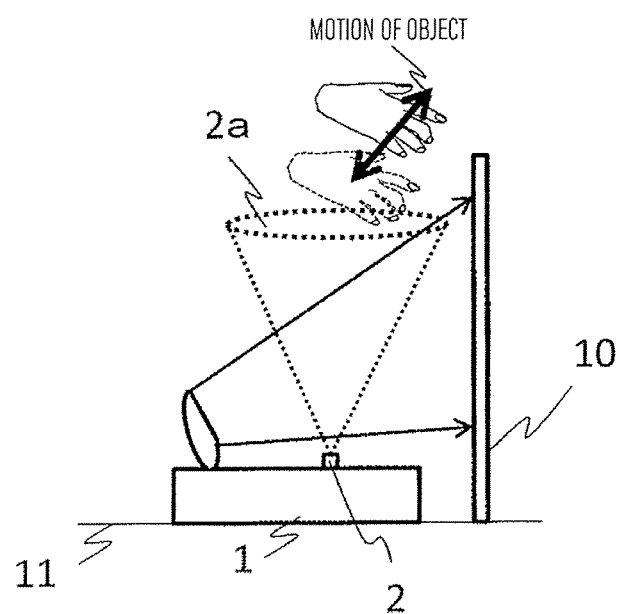
FIG. 1 is a schematic view of a projection device according to Embodiment 1.

FIG. 1 is a schematic view of the projection device according to Embodiment 1.

The configuration of the present embodiment includes a projection unit 1, a detection element 2, a screen 10, and a projection device arranging table 11. The projection device 1 is arranged on the projection device arranging table 11 and projects an image on the screen 10. The detection element 2 detects a gesture in a detection range 2a. The detection element 2 may have a light source for detecting the gesture or may be a passive sensor having no light source.

Next, optimization of the detection range in accordance with the projection direction will be described.

Figure 2A:
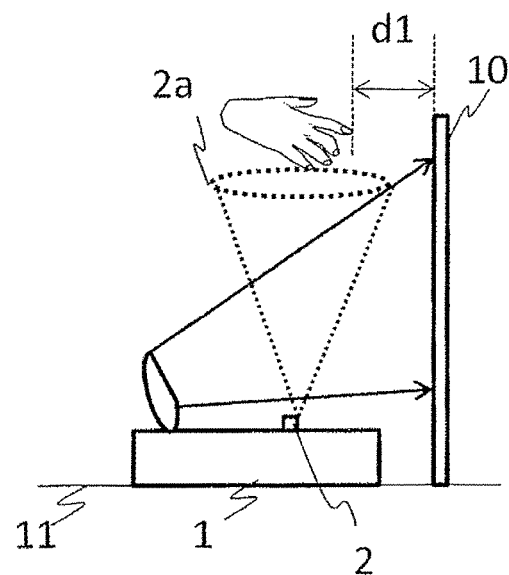
FIG. 2A is a first schematic view illustrating a projecting state of the projection device.
Figure 2B:
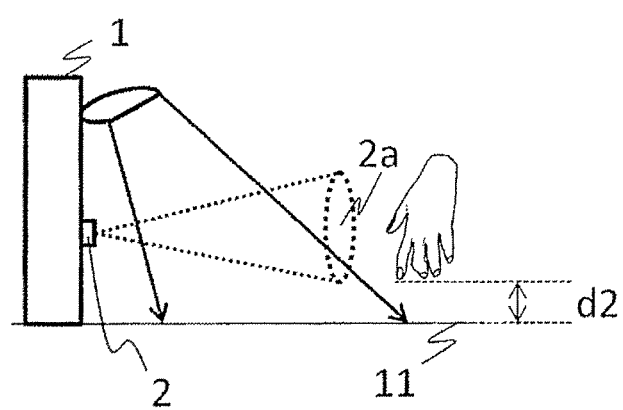
FIG. 2B is a second schematic view illustrating a projecting state of the projection device.

FIGS. 2A and 2B are first and second schematic views illustrating projecting states of the projection device 1. FIG. 2A illustrates a case in which the image is projected on the screen 10 (hereinafter, a wall surface projection case), and FIG. 2B illustrates a case in which the image is projected on the projection device arranging table 11 (hereinafter, a tabletop projection case).

First, FIG. 2A will be described. In FIG. 2A, an operator performing a gesture (hereinafter, an operator) is located close to the screen 10 while an observer looking at the image projected on the screen 10 observes the image at a position away from the screen 10. The operator generally stands to keep away from a projection screen of the projection unit 1 to prevent the projection screen from being blocked. Accordingly, the distance between the operator and the detection element 2 tends to be long. Also, the screen 10 changes depending on the use environment of a user, and it is assumed that a certain object such as a wall is used as the screen 10. Accordingly, the operator psychologically tends to be located away from the screen 10, and it is assumed that the operator performs the gesture at a position away from the detection element 2.

Next, FIG. 2B will be described. In FIG. 2B, since the tabletop projection is performed, the operator has little chances to block the image, and it is assumed that the operator performs the gesture at a position close to the screen.

Since a required operation range differs in the wall surface projection case and in the tabletop projection case from the above reasons, the detection range of the detection element 2 needs to be specified on the premise of both the operation ranges.

However, in a case in which a detection range containing both the operation ranges is specified, sensitivity is lowered as much as the increase of the detection range. Also, since detection is performed in the range containing an unnecessary range for the other projection state, erroneous detection such as detection of a gesture performed by a person other than the operator may be carried out. Based on the above, in order to satisfy both the sensitivity and the detection in the necessary operation range, it is clear that the detection range needs to be switched depending on the projection state.

Although only the wall surface and the tabletop have been raised as examples of the projection states here, there is a wide variety in the projection direction, the arranging place, and the distance between the projection device 1 and the screen 10. For example, as for the projection direction, a ceiling is assumed, as well as the tabletop and the wall surface. As for the arranging place, a wall surface and a ceiling are assumed. Accordingly, it is necessary to set an optimal detection range 2a depending on the arrangement and the projection state.

Next, the detection range control unit setting the optimal detection range will be described.

FIG. 3 is a block diagram illustrating an internal configuration of the projection device 1.

The projection device 1 includes a gesture detection unit 14 and a projection unit 4.

First, the gesture detection unit 14 will be described. The gesture detection unit 14 includes a detection signal calculation unit 3 and a detection range switching unit 5. The detection signal calculation unit 3 includes a signal detection unit 3a, a gesture determination unit 3b, and an operating signal generating unit 3c. In the detection signal calculation unit 3, the signal detection unit 3a detects a signal containing gesture information of the operator supplied from the detection element 2 and supplies the signal to the gesture determination unit 3b. Subsequently, based on the signal supplied, the gesture determination unit 3b performs signal processing for determining various gesture motions. In addition, the operating signal generating unit 3c outputs an operation command signal in accordance with an output signal of the gesture determination unit 3b to an external device 6 such as a personal computer (PC) and a smartphone. The external device 6 controls an image signal to be supplied to the projection device 1 in accordance with the operating signal of the operating signal generating unit 3c.

By doing so, the image to be projected from the projection device 1 to the screen 10 is controlled in accordance with the operation command signal generated based on the gesture performed by the operator. For example, in accordance with a direction in which the operator moves his/her hand, the display image is scrolled or replayed frame by frame. It is to be noted that the external device 6 may be anything as long as it supplies the image signal to the projection device 1. For example, the external device 6 may be a card-like recording medium to be inserted in a card interface provided in the projection device 1.

Next, the projection unit 4 will be described. The projection unit 4 includes an image control unit 4a, a light source unit 4b, a light control unit 4c, a projection lens 4d and a projection mirror 4e. The image control unit 4a outputs control signals to the light source unit 4b and the light control unit 4c in accordance with the image signal supplied from the external device 6. The light source unit 4b includes a light source emitting light such as a halogen lamp, an LED, and a laser and adjusts a light volume in accordance with the output signal of the image control unit 4a. In a case in which the light source unit 4b includes three colors of R, G, and B, the light volumes of the three colors may be controlled independently in accordance with the image signal. The light control unit 4c includes an optical system component such as a mirror, a lens, a prism, and an imager (e.g., a display device such as a liquid crystal display panel) and generates an optical image based on the image signal supplied from the external device 6 with use of light emitted from the light source unit 4b. The projection lens 4d enlarges the image output from the light control unit 4c. The projection mirror 4e reflects light emitted from the projection lens 4d and projects the image on the aforementioned screen 10. As the projection mirror 4e, an aspheric mirror is used. In a case in which an image of the same size is projected, a projection distance can be shortened further than that in a general projection device. Although an example of the projection unit 4 using the projection mirror 4e has been raised in the present embodiment, another configuration may be available instead of this configuration as long as it can carry out image projection. Meanwhile, combination of the projection lens 4d and the projection mirror 4e is hereinafter, sometimes referred to as a projection optical unit.

Next, the detection range switching unit 5 will be described.

Here, a configuration of the detection range switching unit 5, and especially, a switching portion of the detection range and setting of detection sensitivity, will be described.

First, the configuration of the detection range switching unit 5 will be described.

The detection range switching unit 5 includes a detection range switching signal generating unit 5a and a detection element control unit 5b. The detection range switching signal generating unit 5a detects a state of the projection device 1 and outputs a signal in accordance with the state. The detection range switching signal generating unit 5a includes a sensor detecting a projection state (the tabletop projection, the wall surface projection, and the like) based on the arranging place, the projection distance to the screen 10, and the like. As the sensor, a mechanical switch switched by the operator, a gyro sensor detecting inclination of the projection device 1, or a pressure sensor detecting contact with the projection device arranging table 11 may be used. Alternatively, an illuminance sensor may be used. By arranging the illuminance sensor on a side of the projection device arranging table 11 in the wall surface projection case or the tabletop projection case, the state detection can be carried out based on illuminance of detected light. Also, the operator may electrically transmit a signal to the detection range switching signal generating unit 5a using a remote control or the like to input the state of the projection device 1.

Meanwhile, the projection state can be detected by using the aforementioned sensor not only in the wall surface projection case or the tabletop projection case but also in a case in which the projection device 1 is arranged to be inclined. Also, in a case in which the detection element 2 includes a laser light source as the light source for gesture detection, by emitting light to the screen 10, the projection distance to the screen 10 can be measured based on a temporal difference between the emitted light and the reflected light. A signal based on distance information detected in the detection element 2 is output via the signal detection unit 3a to the detection range switching signal generating unit 5a.

As the detection element 2 serving as an element for detection, a photodiode detecting laser light or a pyroelectric sensor detecting infrared light generated from a human body is used, for example. Depending on which electromagnetic wave for detection is used, a sensor to be used changes, and whether or not the detection element 2 includes a light source also changes.

The detection element control unit 5b controls the detection range 2a of the detection element 2 in accordance with the signal supplied from the detection range switching signal generating unit 5a.

Next, the switching portion of the detection range will be described.

Figure 4:
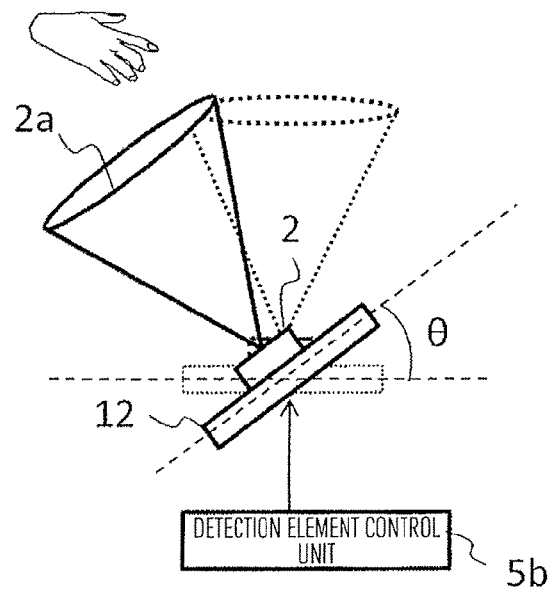
FIG. 4 illustrates a mechanism for adjusting inclination of a detection element.

FIG. 4 illustrates a mechanism adjusting inclination of the detection element 2. The detection element 2 is arranged on a rotating table 12 included in the projection device 1. The rotating table 12 controls a setting angle of the detection element 2 in accordance with the signal of the detection element control unit 5b. In this manner, a position of the detection range 2a can be switched.

To scale an area of the detection range 2a, a movable lens may be provided on the detection element 2. The movable lens changes a distance to the detection element 2 in accordance with the projection direction of the projection device 1 to adjust the detection range 2a. In a case in which the detection element 2 is the pyroelectric sensor detecting changes of intensity of an electromagnetic wave such as infrared light, for example, the detection area can be scaled by moving positions of a hole and a Fresnel lens at an upper part of the pyroelectric sensor.

Figure 5:
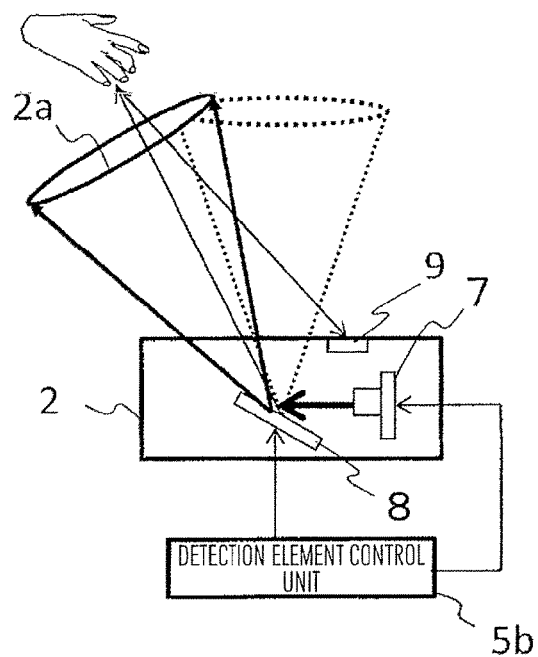
FIG. 5 illustrates a detection range adjusting method using laser scanning.

FIG. 5 illustrates a detection range adjusting method using laser scanning. The detection element 2 includes a laser light source 7, an angle adjustable mirror 8, and a light reception element 9. The detection element control unit 5b outputs control signals to the laser light source 7 and the angle adjustable mirror 8. The angle adjustable mirror 8 receives the signal from the detection element control unit 5b to cause an angle thereof to be adjusted to a setting angle. Also, it is to be understood that the detection range 2a can be controlled by providing the laser light source 7 on the rotating table 12 as illustrated in FIG. 4.

Next, setting of the detection range when a gesture is performed will be described.

Figure 6:
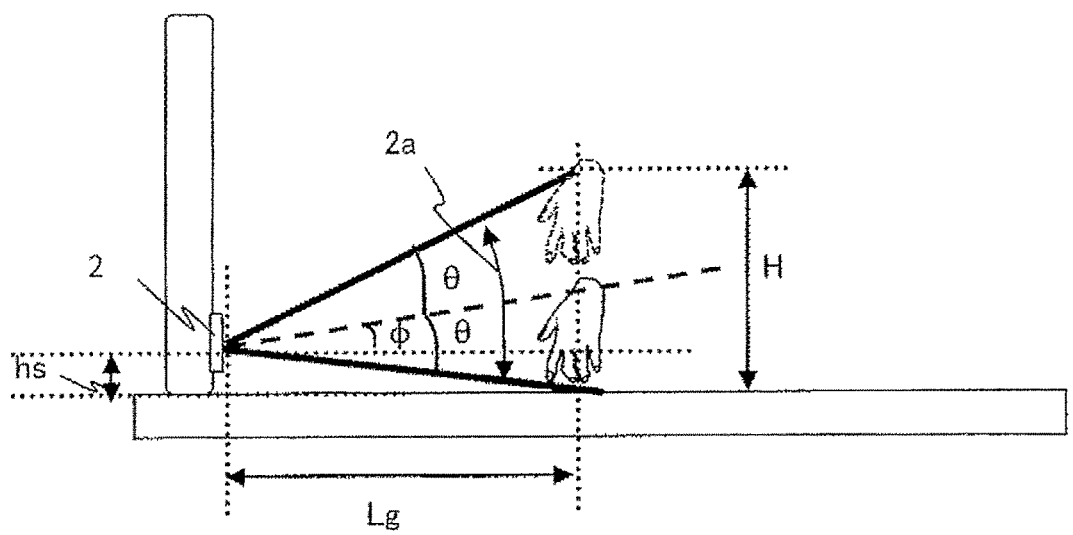
FIG. 6 illustrates an example of detection range setting in a tabletop projection case.

FIG. 6 illustrates an example of detection range setting in the tabletop projection case and illustrates relationship among a detection range (angle) 2θ of the detection element 2, an angle φ between a normal direction of the projection device 1 and a detection center line of the detection element 2 (hereinafter, a detection center angle), a distance Lg from the detection element 2 to a gesture position, a distance hs in a vertical direction from the projection device arranging table 11 to the detection element 2, and an operation area H. Relationship among the detection range 2θ and the respective parameters and relationship among the detection center angle φ and the respective parameters are expressed as Equation 1 and Equation 2 shown below:

$$2\theta = a\tan((H-hs)/Lg) + a\tan(hs/Lg) \quad \text{(Equation 1)},$$

$$\varphi = (1/2)(a\tan((H-hs)/Lg) - a\tan(hs/Lg)) \quad \text{(Equation 2)}.$$

As shown in the above equations, the detection range 2θ and the detection center angle φ are determined by the gesture position Lg, the height hs of the detection element 2, and the operation area H. The operation area H differs depending on the projection state of the projection unit 1. As described above, the operation area H is large in the wall surface projection case and is small in the tabletop projection case. When an actual use environment is assumed, the operation area H in the tabletop projection case is about several cm to 10 cm, and the operation area H in the wall surface projection case is about several cm to tens of cm. The gesture position Lg may be a distance to an end portion of a screen size farthest from the projection device 1, for example. Also, in a case in which a laser light source is used in the detection element 2, the operation range H may be provided in an area preventing eyes of a person from being irradiated in consideration of safety. In the tabletop projection case, the detection range 2θ and the detection center angle φ may be set to prevent eyes from being irradiated when a person sits in front of the front surface of the projection device 1.

Next, the setting of detection sensitivity will be described.

In a case in which a passive sensor (e.g., a pyroelectric sensor) including no light source for gesture detection is used in the detection element 2, an effective way to achieve high-accuracy gesture detection is to set the detection range not to overlap with the tabletop or the wall surface as described below.

Figure 7A:
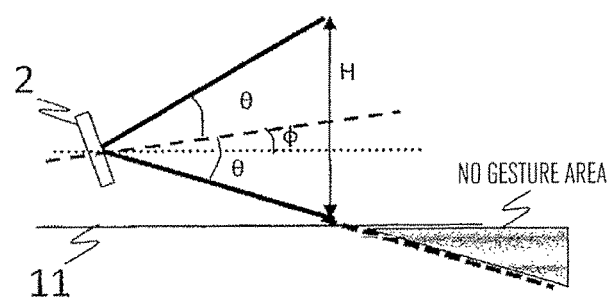
FIG. 7A is a first view illustrating a detection method in a case of using a passive sensor.
Figure 7B:
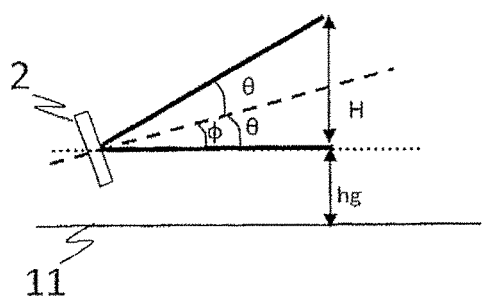
FIG. 7B is a second view illustrating a detection method in a case of using the passive sensor.

FIGS. 7A and 7B are first and second views illustrating detection methods in a case of using the passive sensor (e.g., the pyroelectric sensor).

When the pyroelectric sensor is raised as an example of the passive sensor, the detection amount of the pyroelectric sensor is determined by a percentage of a heat source in the detection range and a heat quantity. That is, the larger the percentage of a gesture in the detection range is, the larger the detection amount becomes. On the other hand, when the detection range overlaps with the projection device arranging table 11 as illustrated in FIG. 7A, an area in which no gesture can be performed will exist. Thus, it is difficult to obtain a large detection amount. To increase the detection amount, a dead zone hg is provided on a lower side of the detection range as illustrated in FIG. 7B to narrow and optimize the detection range so as to eliminate the area in which no gesture can be performed. Accordingly, the large detection amount can be obtained.

The sensitivity may be adjusted depending on the user and the environment. In a case in which the detection amount of the pyroelectric sensor is considered, even when the gesture is performed under the same conditions, the detection amount differs since the hand temperature differs depending on the user. Even when the gesture is performed by the same person, the detection amount differs depending on the environmental temperature. Also, in a case in which the gesture is detected by a laser, the detection amount differs depending on the reflectance of the user's hand. Thus, the detection area may be adjusted in accordance with the user and the environment to improve the sensitivity. When the laser is used, intensity of the laser may be heightened, or the scanning range may be limited to improve the sensitivity.

Figure 8:
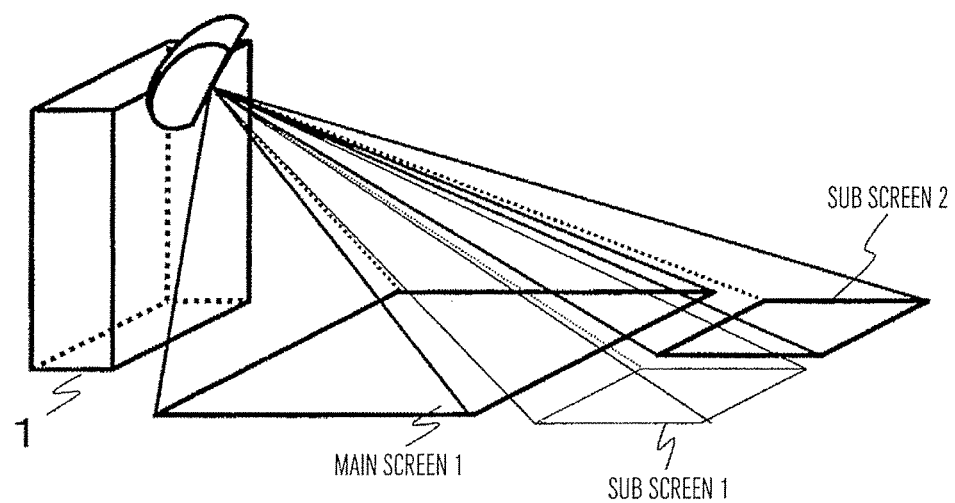
FIG. 8 illustrates a case in which an image of the projection device contains multiple screens.

FIG. 8 illustrates a case in which the image of the projection device 1 contains multiple screens. In FIG. 8, three screens are projected, and one is a main screen while the other two are sub screens. In a case in which the operation is carried out by performing a gesture to, e.g., icons, displayed on the sub screens while looking at the main screen, the main screen does not need to be set in the detection range, and the detection range is thus limited to the two sub screens. Since the detection range can be limited, the detection amount of the detection element 2 increases, and the detection sensitivity is improved. The laser intensity and the detection range may be differentiated between the sub screens.

Also, adjustment of the sensitivity may be done by the user side, or a test mode may be prepared on the side of the projection device 1, and adjustment of the sensitivity may be done automatically based on reference measurement under certain conditions. For example, in a case in which the detection element 2 is a sensor including a light source, the detected amount of reflected light differs depending on the reflectance of the operator's hand, and the detection sensitivity differs. In the test mode, the light source may emit light having predetermined luminance to detect reflected light, and appropriate luminance of the light source to the operator may be determined in accordance with the amount of the reflected light.

Embodiment 2

In the present embodiment, a detection method using line scanning with use of a laser light source in the detection element 2 will be described. In the present embodiment, a principle of a Time-Of-Flight scheme (hereinafter, a TOF scheme) to be used, a configuration for line scanning with use of the laser light source, and control of the detection element 2 will be described.

First, the principle of the TOF scheme will be described.

FIG. 9 illustrates the principle of the TOF scheme. The TOF scheme is a distance measurement method using a time period between a time point of emission of light from the laser light source 7 and a time point of reception of reflected light on the screen 10 by the light reception element 9. When this time period is expressed as t [s], and light speed is $3.0 \times 10^8$ [m/s], a distance L [m] is expressed as Equation 3:

$$L[m] = 3.0 \times 10^8 \times t/2 \quad \text{(Equation 3)}.$$

Next, the configuration for line scanning with use of the laser will be described.

Figure 10:
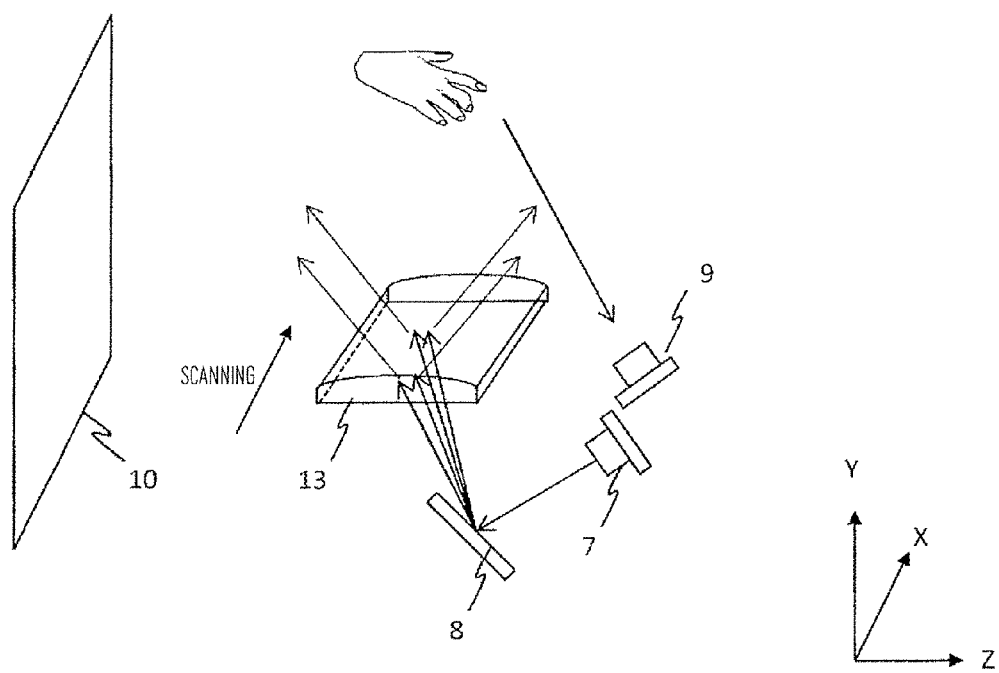
FIG. 10 is a schematic view illustrating a configuration for achieving line scanning with use of a laser light source.

FIG. 10 is a schematic view illustrating a configuration for achieving line scanning with use of the laser light source. The line scanning is achieved by using the laser light source 7, the angle adjustable mirror 8, the light reception element 9, and a cylindrical lens 13.

First, light emitted from the laser light source 7 is reflected on the angle adjustable mirror 8 at an arbitrary angle. The light reflected on the angle adjustable mirror 8 is incident in the cylindrical lens 13 and becomes a line light source spreading in a Z direction. By scanning this line light source in an X direction, line scanning spreading in the Z direction and enabling motion detection in the X direction can be achieved.

As the angle adjustable mirror 8, a mirror that scans only in the X direction illustrated in FIGS. 10, 11A, and 11B is used. In the detection element 2 using the laser in the Embodiment 1, since the mirror that scans two-dimensionally is used, the mirror costs much but can detect information in directions of three axes. On the other hand, in comparison with the mirror in the Embodiment 1, the mirror that scans one-dimensionally in the present embodiment detects information only in directions of two axes but costs less. In the Embodiment 2, by using the mirror 8, which scans one-dimensionally, and the cylindrical lens 13, a method for obtaining a similar function to that in the case of using the mirror that scans two-dimensionally while prioritizing the cost is shown.

Next, the control of the detection element 2 will be described.

FIGS. 11A and 11B are first and second views illustrating laser irradiation ranges of the detection element 2 viewed from a direction of a +y axis. Meanwhile, the XYZ axes are ones illustrated in FIG. 10.

FIG. 11A illustrates differences in the laser irradiation range at a portion directly above the detection element 2 and end portions on a certain XZ plane. Respective x coordinates of the directly above portion and the end portions are x0(=0), x+n, and x−n. In each rectangle elongated in a horizontal direction in the figure, a length of a long side thereof represents an irradiation range while a length of a short side thereof represents light intensity. At x0, the laser irradiation range is narrow since a distance from the detection element 2 to the XZ plane is short. Conversely, at x+n and x−n, the laser irradiation range is broad since the distance from the detection element 2 to the XZ plane is long. Thus, since the intensity of the laser light differs at the portion directly above the detection element 2 and at the end portions, the detection sensitivity decreases from the directly above portion to the end portions. That is, when the gesture is performed at the end portion of the screen 10, sufficient sensitivity may not be obtained. Under such circumstances, the laser intensity needs to be constant regardless of the place so that similar sensitivity can be obtained wherever in the screen 10 the gesture is performed.

FIG. 11B illustrates an example in which the laser irradiation ranges are set to be constant to keep the light intensities constant. To make the laser irradiation ranges constant, the curvature of the lens surface of the cylindrical lens is changed at the portion directly above the detection element 2 and at the end portions. The curvature at the portion directly above the detection element 2 is set to be small, and the curvature is gradually increased toward the end portions. Also, to keep the light intensities further constant, it is effective to set the laser irradiation range at each of the end portions to be smaller than that at the portion directly above the detection element 2. At each of the end portions, the laser is emitted in an inclined manner, and a view angle seen from the light reception element 9 is smaller than that at the portion directly above the detection element 2 even when the intensity is constant. Thus, the light reception intensity relatively decreases, and the sensitivity is lowered. By setting the irradiation range at each of the end portions to be smaller, similar sensitivity can be obtained wherever in the screen 10 the gesture is performed.

It is to be noted that, although the description in which the intensity is adjusted by the laser irradiation range has been provided here, the intensity of the light generated in the laser light source 7 may be adjusted depending on whether the portion directly above the detection element 2 or the end portion is irradiated. Another method may be employed as long as it can achieve a similar function.

Also, to prevent the emitting light of the projection device 1 from influencing detection of the gesture, the laser light source 7 and the light reception element 9 preferably use an infrared wavelength region. By using the infrared wavelength region, highly sensitive detection can be carried out even under outside light.

REFERENCE SIGNS LIST

1: projection device
2: detection element
2a: detection range
3: detection signal calculation unit
3a: signal detection unit
3b: gesture determination unit
3c: operating signal generating unit
4: projection unit
4a: image control unit
4b: light source unit
4c: light control unit
4d: projection lens
4e: projection mirror
5: detection range switching unit
5a: detection range switching signal generating unit
5b: detection element control unit
6: external device
7: laser light source
8: angle adjustable mirror
9: light reception element
10: screen
11: projection device arranging table
12: rotating table
13: cylindrical lens
14: gesture detection unit

The invention claimed is:

1. An image projection device for displaying an image by projecting an optical image, the image projection device comprising:
  a projection unit including:
    a first light source unit that generates light;
    a light control unit that generates the optical image based on an image signal using the light generated by the first light source unit; and
    a projection optical unit that projects the optical image generated by the light control unit;
  a detection element that includes a first sensor that detects a gesture of an operator of the image projection device; and
  a gesture detection unit including:
    an operating signal generating unit that generates an operating signal to operate the image based on the gesture detected by the detection element; and
    a detection range switching unit including:
      a detection range switching signal generating unit that has a second sensor to detect a projection state indicative of a direction of projection of the image projection device and outputs a signal in accordance with the detected projection state of the image projection device; and
      a detection element control unit that controls a range in which the detection element detects the gesture in response to the signal output from detection range switching signal generating unit,
  wherein the second sensor detects a first projection state, in which the optical image is projected in a first direction, and a second projection state, in which the optical image is projected in a second direction different from the first direction,
  wherein the range in which the detection element detects the gesture is different depending on whether the projection state is the first projection state or the second projection state,
  wherein the first projection state is a state where the optical image is projected to a plane perpendicular to a surface on which the image projection device is placed, and the second projection state is a state where the optical image is projected to a plane parallel to the surface on which the image projection device is placed, and
  wherein the range in which the detection element detects the gestures is larger when the second sensor detects the first projection state than when the second sensor detects the second projection state.

2. The image projection device according to claim 1, wherein the second sensor comprises at least one of a mechanical switch, remote control, gyro sensor, pressure sensor, and an illuminance sensor.

3. The image projection device according to claim 2, wherein the detection element detects the gesture three-dimensionally.

4. The image projection device according to claim 3, wherein the detection element comprises:
  a second light source for gesture detection that generates light to be emitted to the operator of the image projection device; and
  an angle adjustable mirror whose setting angle is controllable and at which the light generated by the second light source is reflected and emitted to the operator.

5. The image projection device according to claim 4, wherein the second light source is a laser light source.

6. The image projection device according to claim 4, wherein the first sensor is a photodiode.

7. The image projection device according to claim 2, wherein the first sensor is a pyroelectric sensor that detects infrared light reflected by the operator associated with the image projection device.

8. The image projection device according to claim 7, wherein the detection element comprises a Fresnel lens that collects the infrared light to the pyroelectric sensor.

9. The image projection device according to claim 8, wherein the detection element control unit controls a distance between the Fresnel lens and the pyroelectric sensor based on the direction in which the projection unit projects the light and the state of the image projection device.

10. The image projection device according to claim 4, comprising: a cylindrical lens which receives light originating from the second light source supplied from the angle adjustable mirror, spreads a traveling direction of the light in a direction of a specific plane, and emits the light at the operator.

11. The image projection device according to claim 10, wherein the direction of the specific plane is the direction of projection of the image projection device.

12. The image projection device according to claim 11, wherein a curvature of a lens surface of the cylindrical lens increases from a center portion to an end portion.

13. The image projection device according to claim 6, wherein the detection element measures a distance using a TOF scheme, which is based on a length of time from when the light is emitted from the second light source to the time at which the first sensor detects the light.

14. The image projection device according to claim 4,
wherein the projection unit projects light based on a plurality of images on a plurality of screens, and
wherein the detection element detects the gesture at any of the plurality of screens.

15. The image projection device according to claim 14, wherein the operating signal from the operating signal generating unit is sent to a smartphone, and in response to receiving the operating signal the smartphone outputs a image signal to the image projection device to enable the operator to replay content frame by frame on the plurality of screens.

\* \* \* \* \*